United States Patent [19]

Kuroda

[11] Patent Number: 4,984,858
[45] Date of Patent: Jan. 15, 1991

[54] LIGHT BEAM SCANNING OPTICAL SYSTEM

[75] Inventor: Muneo Kuroda, Osaka, Japan

[73] Assignee: Minolta Camera Kabushiki Kaisha, Osaka, Japan

[21] Appl. No.: 306,583

[22] Filed: Feb. 3, 1989

[30] Foreign Application Priority Data

Feb. 4, 1988 [JP] Japan .................................. 63-25411
Mar. 15, 1988 [JP] Japan .................................. 63-62154

[51] Int. Cl.⁵ .................................................. G02B 26/10
[52] U.S. Cl. ..................................... 350/6.8; 250/235
[58] Field of Search ................. 350/6.8, 6.7, 6.6, 6.5, 350/6.1, 6.91, 6.4; 250/235, 236; 358/494

[56] References Cited

U.S. PATENT DOCUMENTS 3,469,030  9/1969  Priebe .
3,750,189  7/1973  Fleischer .............................. 350/6.8
3,946,150  3/1976  Grafton ................................ 350/6.8
4,847,492  7/1989  Houki ................................... 250/236
4,848,864  7/1989  Ostertag et al. ...................... 350/6.8

FOREIGN PATENT DOCUMENTS 3644124  11/1988  Fed. Rep. of Germany .
54-123040  9/1979  Japan .
55-36127  9/1980  Japan .
61-173212  8/1986  Japan .

Primary Examiner—Bruce Y. Arnold
Assistant Examiner—Loha Ben
Attorney, Agent, or Firm—Price, Gess & Ubell

[57] ABSTRACT

A cylindrical lens for use in a light beam scanning optical system is arranged to have a luminous flux enter a deflection device in straight line in the direction of deflection. The luminous flux deflected by the deflection device enters a toroidal lens and is then directed toward the concave surface of the cylindrical mirror or a spherical mirror to converge on the surface of a photoconductor.

12 Claims, 6 Drawing Sheets

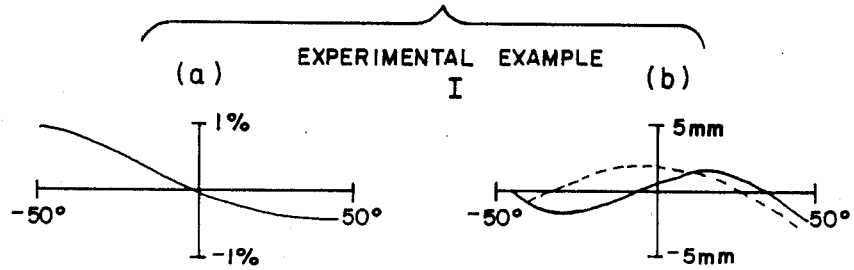
Fig. 4 EXPERIMENTAL EXAMPLE I
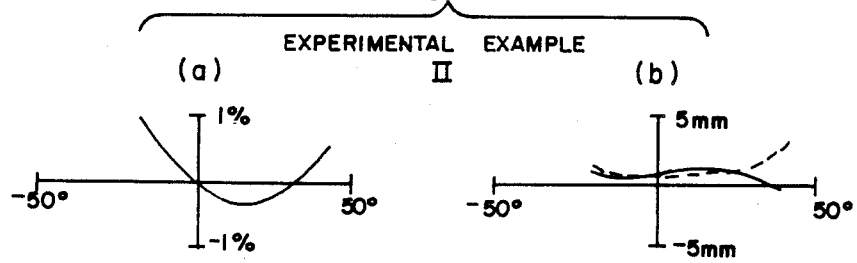
Fig. 5 EXPERIMENTAL EXAMPLE II
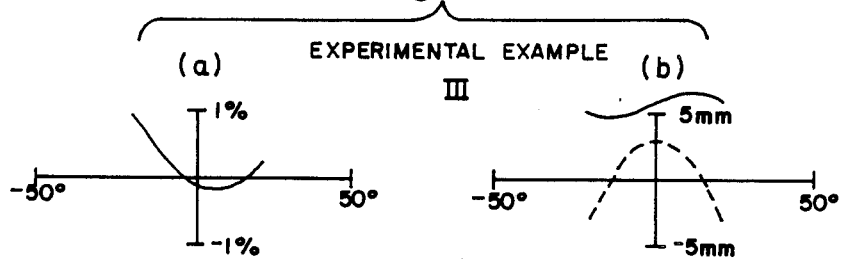
Fig. 6 EXPERIMENTAL EXAMPLE III
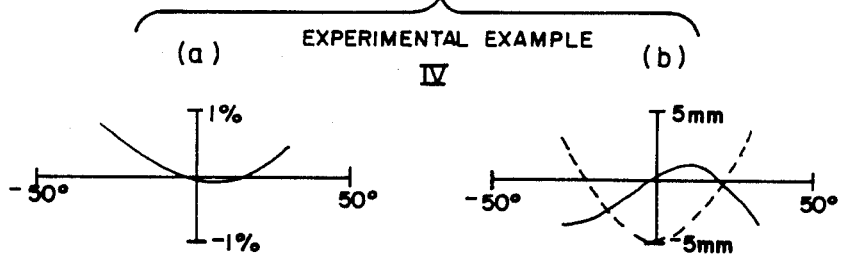
Fig. 7 EXPERIMENTAL EXAMPLE IV

LIGHT BEAM SCANNING OPTICAL SYSTEM

BACKGROUND OF THE INVENTION

1. Technical Field of the Invention

The present invention relates to a light beam scanning optical system, and more particularly to a structure of a light beam scanning optical system incorporated in laser beam printers, facsimile and the like for deflectively collecting and scanning on a photoconductor a luminous flux which is provided with image information.

2. Brief Description of Related Art

Generally, the light beam scanning optical system utilized in laser beam printers and facsimile basically comprises a semiconductor laser as a light source, a deflecting means such as polygon mirror and galvano mirror, and an fθ lens. The deflecting means is utilized for scanning a luminous flux emitted from the semiconductor laser at an equiangular velocity, however, homogeneous image can not be obtained since there occurs difference in scanning speed over the range from central portion to both edges in the main scanning direction at light collecting surface. An fθ lens is therefore provided for rectifying the difference in the scanning speed.

The fθ lens is made by combining various concave lenses, convex lenses and the like, and lens planning is extremely complicated. Because of a number of surfaces to be ground, it is quite hard to improve accuracy in manufacturing process and the cost is quite expensive. Moreover, there is limitation in selecting a material which possesses good permeability.

Accordingly, in place of the fθ lens, the use of elliptical mirror (Japanese Published Unexamined Patent Application No. 123040/1979), the use of parabolic mirror (Japanese Published Examined Patent Application No. 36127/1980) and the use of concave reflector (Japanese Published Unexamined Patent Appliation No. 173212/1986) have heretofore been proposed. However, there are difficulties in manufacturing the elliptical mirror and parabolic mirror with further difficulty in obtaining high manufacturing accuracy.

When a concave reflector is used, it is necessary to prepare the same length of a concave reflector as that of the main scanning direction since the reflected light is being collected in the direction perpendicular to the surface of a photoconductor thereby causing the optical system itself to become impracticably large in size.

SUMMARY OF THE INVENTION

The main object of the present invention is to provide an inexpensive and compact light beam scanning optical system capable of making the curvature of the field at the light collecting point smaller and at the same time effectively rectifying an error in the inclination of image on a deflection device by adopting a scanning speed correcting means which can be readily manufactured and is capable of improving manufacturing accuracy in place of the expensive and limited availability of fθ lens, parabolic mirror and the like which heretofore have been proposed.

Another object of the present invention is to provide a light beam scanning optical system capable of most advantageously improving manufacturing accuracy by arranging to collect a convergent luminous flux emitted from a deflection device onto the surface of photoconductor with the use of a combination of a toroidal lens and a cylindrical mirror.

Still another object of the present invention is to provide a light beam scanning optical system capable of making a curvature of the field perpendicular to the scanning direction smaller wherein the light beam is deflected at a light collecting point with an arrangement for collecting a convergent luminous flux emitted from a deflection device onto the surface of a photoconductor with the use of a combination of a toroidal lens and a spherical mirror.

Further object of the present invention is to provide a light beam scanning optical system capable of promoting higher efficiency by specially arranging the positional relationship of optical members and the curvature of a reflective surface.

These and other objects and features of the present invention will become more apparent from the following description taken in conjunction with the accompanying drawings which illustrate specific embodiments of the invention.

BRIEF DESCRIPTION OF THE DRAWINGS

FIGS. 4 through 7 are graphs showing aberrations on the light collecting surface in each experimental example of the first embodiment of the present invention. In the (a) in each graph, the horizontal axis shows the angle of deflection and the vertical axis degree of distortion, and in the (b), the horizontal axis shows the angle of deflection and the vertical axis degree of curvature.

It is to be noted that like members are designated by like numerals and repeated descriptions are omitted.

DESCRIPTION OF PREFERRED EMBODIMENT

Embodiments of the present invention will now be described with reference to accompanying drawings.

Figure 1:
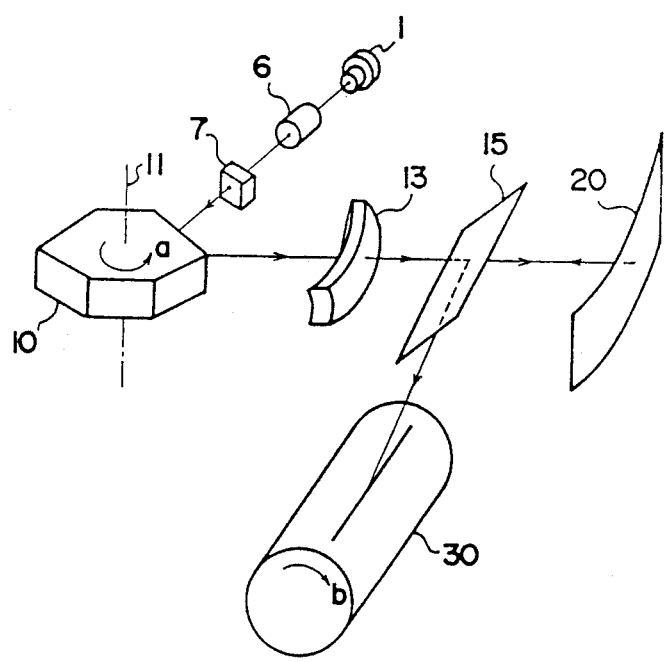
FIG. 1 is a perspective view showing the whole structure of a first embodiment of the present invention which is applied to a laser beam printer.

FIG. 1 shows a first embodiment of the present invention which is applied to a laser beam printer. The numeral 1 in the figure designates a semiconductor laser which is intensely modulated by an unillustrated control circuit and radiates an emitting luminous flux provided with image information.

The emitted luminous flux is rectified to a collimated luminous flux by passing through a collimator lens 6. The collimated luminous flux further converges on a straight line in the direction perpendicular to a rotation axis of a polygon mirror 10 (in the direction of beam scanning) by passing through a cylindrical lens 7. The luminous flux which passed through the cylindrical lens 7 thus converges on a straight line facing the direction of rotation of the polygon mirror 10 at its reflective facet.

The polygon mirror 10 is rotatively driven by an unillustrated motor at a constant speed in the direction of arrow a centering on a shaft 11. Accordingly, the convergent luminous flux emerged from the cylindrical lens 7 is successively reflected on the facet of polygon mirror 10 and is deflected at an equiangular velocity. The luminous flux after deflection permeates a toroidal lens 13 and a beam splitter 15, and is then reflected on the side of concave surface of a cylindrical mirror 20, which is further reflected by the beam splitter 15 and is collected onto the surface of photoconductor. The collected luminous flux at this stage is scanned at a uniform velocity in the axial direction of the photoconductor 30, which is called main scanning. While, the photoconductor 30 is rotatively driven at a constant speed in the direction of arrow b and the scanning by this rotation is called sub-scanning.

In such a light beam scanning optical system, an image (an electrostatic latent image) is formed on the surface of photoconductor 30 by intense modulation of the semiconductor laser 1 with the main and sub-scanning.

Figure 2:
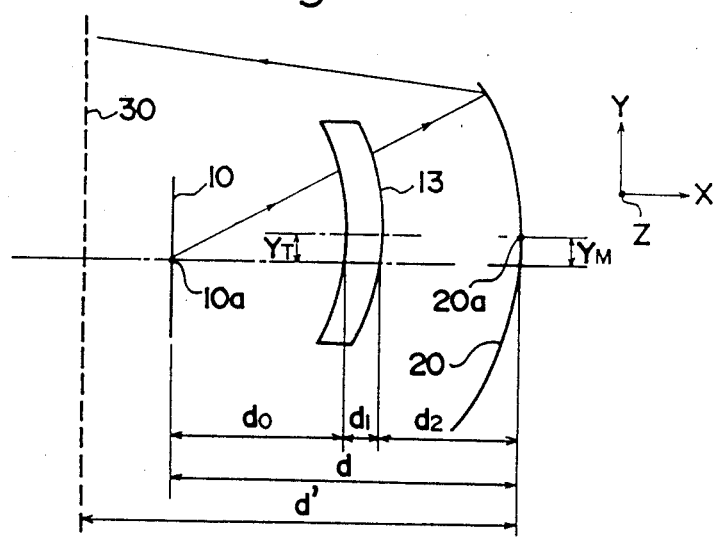
FIGS. 2 and 3 are plan view and side elevation for schematically explaining the light path of the optical system in FIG. 1.
Figure 3:
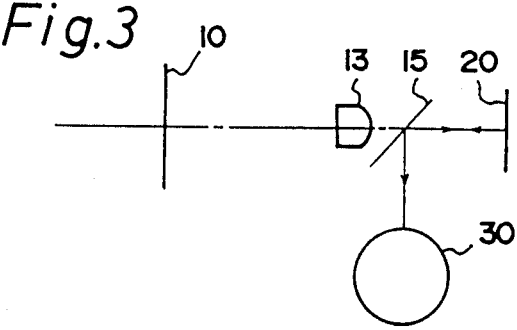

As shown in FIG. 2, in place of the conventional $f\theta$ lens, the toroidal lens 13 and cylindrical mirror 20 rectify the scanning speed to be uniform over the range from the center to both edges of scanning area in the main scanning direction.

The cylindrical mirror 20 is provided with a predetermined curvature on the deflection plane and the curvature of surface perpendicular to the deflection plane is made infinity.

The toroidal lens 13 disposed in the reflective light path from the polygon mirror 10 is arranged to mainly rectify an error of image inclination of the polygon mirror 10.

If there occurs a tilt error on each reflective facet of the polygon mirror 10, a scanning line on the photoconductor 30 slips in the direction of sub-scanning and an irregular pitch is produced on an image. The error by the inclination of image can be rectified by setting each reflective facet of the polygon mirror 10 and light collecting surface of the photoconductor 30 in conjugate relation produced by an optical system in the section perpendicular to the deflection plane by the polygon mirror 10.

In the present invention, a luminous flux is collected onto the polygon mirror 10 by the cylindrical lens 7, while each reflective facet of the polygon mirror 10 and the surface of the photoconductor 30 are arranged to maintain the conjugate relation by the toroidal lens 13.

With regard to the toroidal lens, in order to level the image plane produced by a luminous flux in the section perpendicular to the deflection plane by the polygon mirror 10, the radius of curvature of the toroidal lens 13 in the deflection plane should be set at a proper value (refer to $R_1a$ and $R_2a$ in the following experimental examples), and it is preferable to dispose the lens 13 by shifting the length by $Y_T$ in the direction of Y in FIG. 2. The radius of curvature $R_1a$ and $R_2a$ in the deflection plane becomes a little longer in length as compared with the distance $d_o$ which extends from a reflective point of a luminous flux directed toward the center of the scanning area by the polygon mirror 10 (hereinafter called point of deflection 10a) to the toroidal lens 13. The proper length of shift $Y_T$ of the toroidal lens 13 is dependent on the size of the polygon mirror 10, angle of image, incident direction of luminous flux onto the polygon mirror, etc. It is also preferable to properly shift the cylindrical mirror 20 by $Y_M$ in the main scanning direction since aberration correction and disposition of the mirror can be made easily. Concrete examples will be shown in the following experimental examples I through IV.

In this embodiment, an emitting luminous flux is rectified to a collimated luminous flux by the collimator lens 6 so that the curvature at light collecting point (image forming plane) on the photoconductor 30 can be rectified. In other words, when a convergent luminous flux enters a polygon mirror 10 (the same as those of other rotative deflection devices), the light collecting point on the polygon mirror 10 after reflection becomes almost a circular arc centering on the point of reflection and forms a curvature of the field if there are no optical members behind the polygon mirror 10. The curvature of the field becomes a concaved state in the direction of incident light. The distance between a cylindrical mirror 20 and image plane is changed according to the state of convergence of the incident light. The curvature of the field is also changed by variation of the distance. Practically, the curvature of the field made by a concave plane of the cylindrical mirror 20 is rectified by the curvature of the field made by the convergent luminous flux to result in making the curvature of the field at the light collecting surface smaller and improve the level of the image plane.

When the curvature of the field becomes smaller, the variation in the diameter of convergent luminous flux caused by the difference in scanning position (image height) becomes smaller, and an optical system can be utilized in wider angles and image can be more densely produced since the diameter of convergent luminous flux can be made smaller.

As shown in FIG. 2, in addition to the relationship between the distance d from a point of deflection 10a of the polygon mirror 10 to the vertex 20a of the cylindrical mirror 20 and the radius of curvature $R_3a$ of the cylindrical mirror 20, the relationship between the radius of curvature $R_3a$ and the distance s (not illustrated) from the point of deflection 10a to the light collecting point after deflection of the polygon mirror 10 are set to preferably fulfill the following equations:

$$(|s/R_3a|) > 0.5 \tag{2}$$

$$0.1 < (d/|R_3a|) < 0.7 \tag{2}$$

In addition d' in FIG. 2 shows the distance from the vertex 20a of the cylindrical mirror 20 to the photoconductor 30.

When the above equations (1) and (2) are fulfilled, satisfactory distortional characteristics as well as a satisfactory level of image plane can be obtained over a wide range of angles. The minimum and maximum values in each one of the above equations are set within the experientially permissible range of image distortion on the photoconductor 30.

If the value is less than the minimum limit in the equation (1), the image plane approaches the cylindrical mirror 20 and it makes it difficult to properly dispose the mirror 20 and the distortional characteristic becomes worse.

On the other hand, if the value is less than the minimum limit in the equation (2), positive distortion is increased according to the increment of angle of deflection to result in an elongation of the image at both edges in the main scanning direction (in the neighborhood of scan starting and scan ending positions). If the value exceeds the maximum limit, negative distortion is increased according to the increment of the angle of deflection to result in the shrinkage of an image at both edges in the main scanning direction, and the curvature of the field further becomes large.

The constructional data in the experimental examples I, II, III and IV will be shown below, wherein the diameter of the inscribed circle of the polygon mirror 10 is set at 23.5 mm.

|  | EXPERIMENTAL EXAMPLE | | | |
|---|---|---|---|---|
|  | I | II | III | IV |
| Radius of Curvature of Cylindrical Mirror on deflection plane ($R_3a$)mm | −200 | −200 | −200 | −200 |
| Radius of Curvature of Cylindrical Mirror on surface perpendicular to deflection plane ($R_3b$)mm | ∞ | ∞ | ∞ | ∞ |
| Distance from Point of Deflection to Light Collecting Point (s)mm | 158 | 100 | 298 | 258 |
| Distance from Point of Deflection to Cylindrical Mirror (d)mm | 55 | 80 | 35 | 120 |
| Distance from Point of Deflection to Plane of Incidence of Toroidal Lens ($d_0$)mm | 25 | 25 | 15 | 25 |
| Thickness of Toroidal Lens ($d_1$)mm | 5 | 5 | 5 | 5 |
| Distance from Plane of Projection of Toroidal Lens to Cylindrical Mirror ($d_2$)mm | 25 | 50 | 15 | 90 |
| Distance from Cylindrical Mirror to Photoconductor (d')mm | 62 | 30 | 103 | 80 |
| Radius of Curvature of Toroidal Lens on the side of incidence deflection plane ($R_1a$)mm | −27 | −28 | −18.5 | −32 |
| Radius of Curvature of Toroidal Lens on the side of projection of deflection plane ($R_2a$)mm | −32 | −33 | −23.5 | −37 |
| Radius of Curvature of Toroidal Lens on surface perpendicular to deflection plane on the side of incidence ($R_1b$)mm | ∞ | ∞ | ∞ | ∞ |
| Radius of Curvature of Toroidal Lens on surface perpendicular to deflection plane on the side of projection ($R_2b$)mm | −11.1 | −10.9 | −8.35 | −12.3 |
| Refractive Index of Toroidal Lens | 1.51117 | 1.51117 | 1.51117 | 1.51117 |
| Eccentricity of Toroidal Lens ($Y_T$)mm | +1.5 | +1.0 | +0.9 | +1.0 |
| Eccentricity of Cylindrical Lens ($Y_M$)mm | −1.0 | ±0.0 | +0.9 | +2.0 |
| $\|s/R_3a\|$ | 0.79 | 0.50 | 1.49 | 1.29 |
| $d/\|R_3a\|$ | 0.275 | 0.40 | 0.175 | 0.60 |

The aberrations at the light collecting surface of the photoconductor in each one of the above experimental examples I, II, III and IV are shown in FIGS. 4 through 7.

In the figures (a), angle of deflection is shown by horizontal axis and degree of distortion by vertical axis, while in the figures (b), angle of deflection is shown by horizontal axis and degree of curvature by vertical axis. A dotted line shows curvature of the field by a luminous flux in the deflection plane and a solid line shows curvature of the field by a luminous flux in the vertical plane against the deflection plane.

In case of the present embodiment, by providing a toroidal lens and a cylindrical mirror in the light path extending from a deflection device to the surface of the photoconductor, the scanning speed in the main scanning direction can be uniformly rectified, and moreover a satisfactory distortional characteristics as well as a satisfactory level on the image plane can be obtained over a wide range of angles at the light collecting surface.

The cylindrical mirror can be prepared by grinding and cutting a base material into a predetermined width in the direction perpendicular to the deflection plane. It can also be cut into a number of pieces, and they can be ground at the same time. Compared with the conventional fθ lens, it can be easily manufactured with improved manufacturing accuracy. As a whole, it can be utilized as an inexpensive and highly efficient scanning optical system since the material can be widely selected as it need not be transparent. The light path is turned over by the cylindrical mirror itself and the whole optical system becomes compact in size. Moreover, compared with a parabolic mirror and an elliptical mirror, it can be advantageously manufactured with improved manufacturing accuracy compactly as compared with the conventional concave reflector. Further, with the toroidal lens disposed between a deflection device and a cylindrical mirror, the error caused by inclination of each reflective facet of the deflection device can be rectified to correct irregular pitch in the sub-scanning direction of image.

Figure 8:
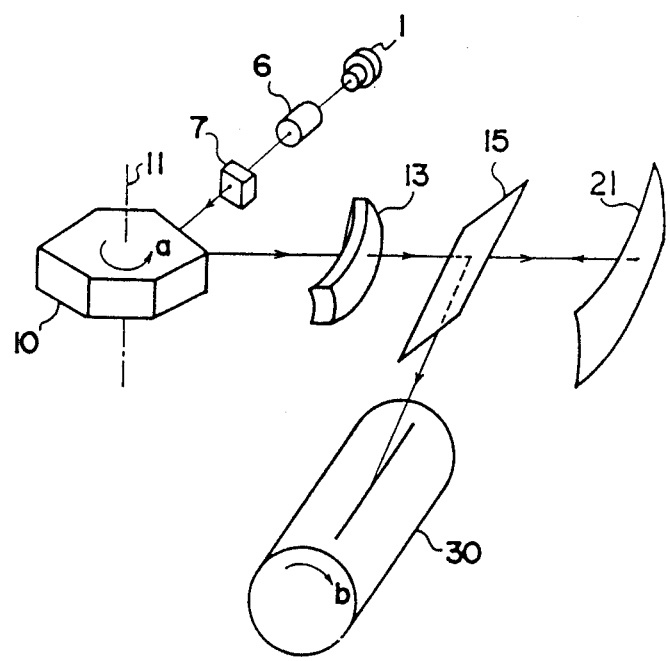
FIG. 8 is a perspective view showing the whole structure of a second embodiment of the present invention which is applied to a laser beam printer.

In a second embodiment of the present invention shown in FIG. 8, a luminous flux which has passed through a beam splitter 15 is turned over at the concave surface of a spherical mirror 21 to collect light on the surface of photoconductor 30, which is different from the first embodiment of the present invention. By deflecting the light beam at a light collecting point, it becomes possible to lessen the curvature of the field perpendicular to a scanning direction.

Concrete examples of this embodiment will be shown in the following experimental examples V through IX.

Figure 9:
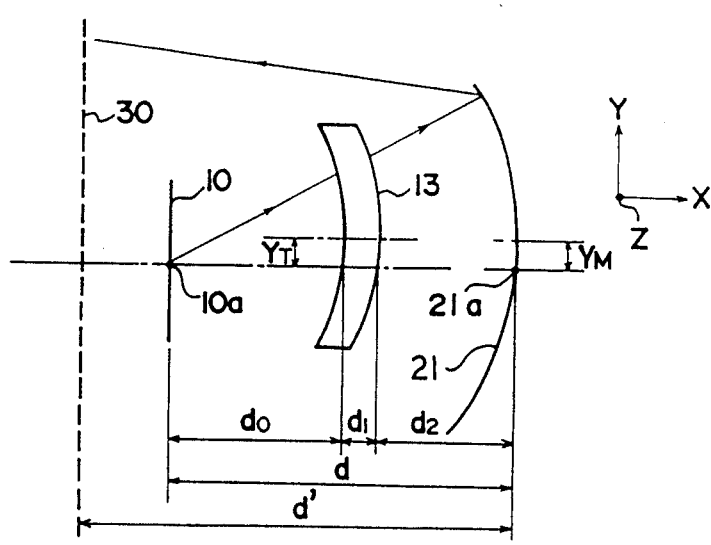
FIGS. 9 and 10 are a plan view and side elevation view schematically explaining light path of the optical system in FIG. 8.
Figure 10:
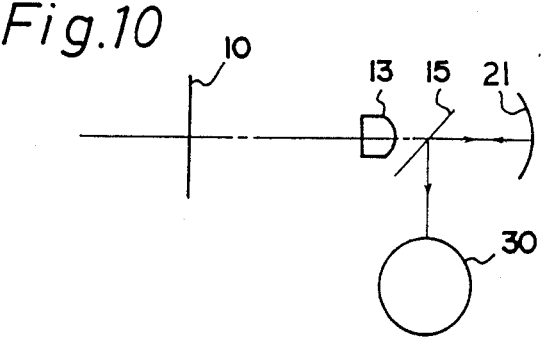
Figure 11:
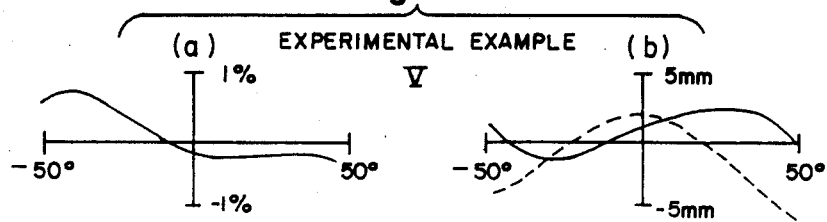
FIGS. 11 through 15 are graphs showing aberrations on the light collecting surface in the second embodiment of the present invention. In the (a) in each graph, the horizontal axis shows an angle of deflection and the vertical axis degree of distortion, and in the (b), the horizontal axis shows the angle of deflection and the vertical axis degree of curvature.
Figure 12:
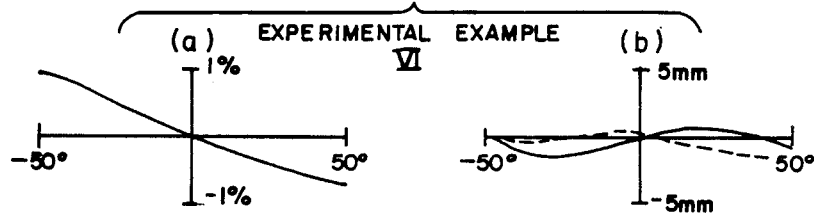
Figure 13:
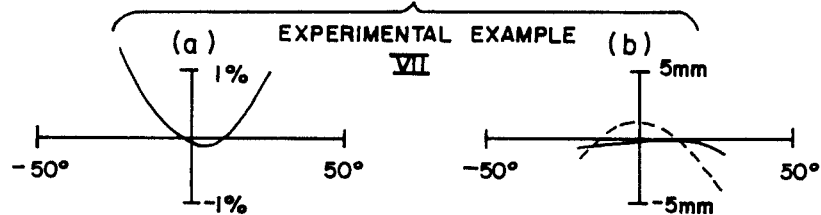
Figure 14:
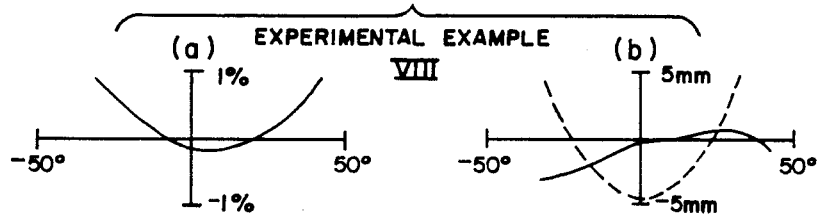
Figure 15:
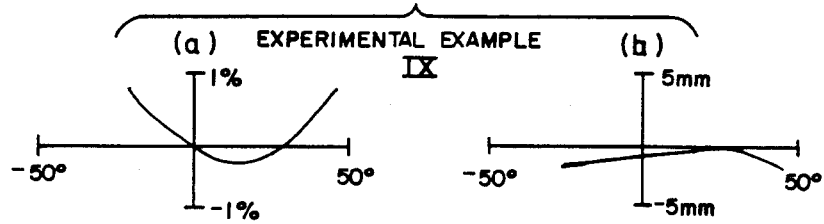

As shown in FIG. 9, in addition to the relationship between the distance d from a point, of deflection 10a of the polygon mirror 10 to the vertex 21a of the spherical mirror 21 and the radius of curvature $R_M$ of the spherical mirror 21, the relationship between the radius of curvature $R_M$ and the distance s (not illustrated) from the point of deflection 10a to the light collecting point after deflection of polygon mirror 10 are set to preferably fulfill the following equations:

$$(|s/R_M|) > 0.4 \qquad (3)$$

$$0.1 < (d/|R_M|) < 0.7 \qquad (4).$$

In addition, d' in FIG. 2 shows the distance from the vertex 21a of the spherical mirror 21 to the photoconductor 30.

When the above equations (3) and (4) are fulfilled, satisfactory distortional characteristics as well as a satisfactory level of image plane can be obtained over a wide range of angles. The minimum and maximum values in each one of the above equations are set within the experientially permissible range of image distortion on the photoconductor 30.

If the value is less than the minimum limit in the equation (3), the image plane approaches the spherical mirror 21 and makes it difficult to properly dispose the mirror 21 and the distortional characteristic becomes worse.

On the other hand, if the value is less than the minimum limit in the equation (4), positive distortion is increased according to the increment of angle of deflection to result in the elongation of image at both edges in the main scanning direction (in the neighborhood of scan starting and scan ending positions). If the value exceeds the maximum limit, negative distortion is increased according to the increment of angle of deflection to result in the shrinkage of image at both edges in the main scanning direction and the curvature of the field further becomes large. The constructional data in the experimental examples V, VI, VII, VIII and IX will be shown below, wherein the diameter of inscribed circle of the polygon mirror 10 is set at 23.5 mm.

|  | EXPERIMENTAL EXAMPLE | | | | |
| --- | --- | --- | --- | --- | --- |
|  | V | VI | VII | VIII | IX |
| Radius of Curvature of Spherical Mirror ($R_M$)mm | −200 | −200 | −200 | −200 | −200 |
| Distance from Point of Deflection to Light Collecting Point (s)mm | 217 | 167 | 137 | 277 | 97 |
| Distance from Point of Deflection to Spherical Mirror (d)mm | 50 | 60 | 30 | 120 | 70 |
| Distance from Point of Deflection to Plane of Incidence of Toroidal Lens($d_0$)mm | 20 | 25 | 15 | 25 | 25 |
| Thickness of Toroidal Lens($d_1$)mm | 5 | 5 | 5 | 5 | 5 |
| Distance from Plane of Projection of Toroidal Lens to Spherical Mirror($d_2$)mm | 25 | 30 | 10 | 90 | 40 |
| Distance from Spherical Mirror to Photoconductor (d')mm | 73 | 61 | 68 | 78 | 32 |
| Radius of Curvature of Toroidal Lens on deflection plane on the side of incidence ($R_{1a}$)mm | −28 | −35 | −21 | −39 | −32 |
| Radius of Curvature of Toroidal Lens on deflection plane on the side of projection ($R_{2a}$)mm | −33 | −40 | −26 | −44 | −37 |
| Radius of Curvature of Toroidal Lens on surface perpendicular to deflection plane on the side of incidence ($R_{1b}$)mm | ∞ | ∞ | ∞ | ∞ | ∞ |
| Radius of Curvature of Toroidal Lens on surface perpendicular to deflection plane on the side of projection ($R_{2b}$)mm | −11.4 | −13 | −9.3 | −13.7 | −11.5 |
| Refractive Index of Toroidal Lens | 1.51117 | 1.51117 | 1.51117 | 1.51117 | 1.51117 |
| Eccentricity of Toroidal Lens ($Y_T$)mm | 1.5 | 1.5 | 1.0 | 1.5 | 1.5 |
| $|s/R_M|$ | 1.085 | 0.835 | 0.685 | 1.385 | 0.485 |
| $d/|R_M|$ | 0.25 | 0.3 | 0.15 | 0.6 | 0.35 |

The aberrations at the light collecting surface of the photoconductor in each one of the above experimental examples V, VI, VII, VIII and IX are shown in FIGS. 11 through 15.

In the figures (a), angle of deflection is shown by horizontal axis and degree of distortion by vertical axis, while in the figures (b), angle of deflection is shown by horizontal axis and degree of curvature by vertical axis. A dotted line shows curvature of the field by a luminous flux in the deflection plane and a solid line shows curvature of the field by a luminous flux in the vertical plane against the deflection plane.

The light beam scanning optical system related to the present invention is not limited to each one of the embodiments described above, and various changes and modifications within the scope of the principles may be employed.

For instance, the polygon mirror 10 utilized in the embodiments as a deflection device may be replaced with various other means if it is capable of scanning a luminous flux at an equiangular velocity on a plane. Besides the semiconductor laser, other laser emitting means or a spot light source may be utilized as a light source.

In the second embodiment, shifting of the spherical mirror in the main scanning direction (direction Y, amount of shift $Y_M$ in FIG. 9) is not referred to. However, in consideration of ease in aberration correction and its positioning, it can be shifted in the main scanning direction. For instance, when the distortional aberration is not symmetrical as in the experimental example V of the second embodiment (refer to FIG. 11), the distortional aberration can be further reduced by shifting the spherical mirror as described.

In each one of the above embodiments, an emitting luminous flux radiated from a semiconductor laser is rectified to a collimated luminous flux by a collimator lens, however, it may be arranged to rectify the emitting luminous flux merely to a parallel luminous flux.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

I claim:

1. A light beam scanning optical system, comprising:
   a light source means for emitting a modulated luminous flux;
   a luminous flux converging means for converging said modulated luminous flux emitted from the light source means into a straight line in the direction parallel to a deflection plane;
   a deflection device disposed in the vicinity where said luminous flux is converged into said straight line for deflecting the converged luminous flux at an equiangular velocity;
   a cylindrical mirror for collecting luminous flux from the deflection device and turing said collected luminous flux onto the surface of a photoconductor; and a toroidal lens disposed between the deflection device and the cylindrical mirror in optical alignment therewith.

2. A light beam scanning optical system as claimed in claim 1, further comprising a luminous flux rectifying means for rectifying said emitted luminous flux from the light source means into one of a parallel luminous flux and a convergent luminous flux.

3. A light beam scanning optical system, comprising:
a light source means for emitting a modulated luminous flux;
a luminous flux converging means for converging said modulated luminous flux emitted from the light source means into a straight line in a direction parallel to a deflection plane;
a deflection device disposed in the vicinity where said luminous flux is converged into said straight line for deflecting the converged luminous flux at an equiangular velocity;
a cylindrical mirror for collecting said luminous flux from the deflection device and turning said collected luminous flux onto the surface of a photoconductor; and
A toroidal lens disposed between the deflection device and the cylindrical mirror in optical alignment therewith, wherein the deflection device and the cylindrical mirror fulfill the following two equations, $$(|s/R_{3a}|) > 0.5 \quad (1)$$

$$0.1 < (d/|R_{3a}|) < 0.7 \quad (2)$$

wherein d is a distance from a point of deflection of the deflection device to the vertex of the cylindrical mirror, $R_{3a}$ is a radius of curvature of the cylindrical mirror in the deflection plane and s is a distance from the point of deflection to a luminous flux collecting point after reflection at said deflection device.

4. A light beam scanning optical system as claimed in claim 3, further comprising a luminous flux rectifying means for rectifying the emitted luminous flux from the light source means into one of a parallel luminous flux and a convergent luminous flux.

5. A light beam scanning optical system as claimed in claim 4, wherein the toroidal lens is offset to one side of the direction of deflection of the luminous flux.

6. A light beam scanning optical system as claimed in claim 5, wherein the cylindrical mirror is offset to one side of the direction of deflection of the luminous flux.

7. A light beam scanning optical system, comprising:
a light source means for emitting a modulated luminous flux;
a luminous flux converging means for converging said modulated luminous flux emitted from the light source means into a straight line in a direction parallel to a deflection plane;
a deflection device disposed in the vicinity where said luminous flux is converged into said straight line for deflecting the converged luminous flux at an equiangular velocity;
a spherical mirror for collecting luminous flux from the deflection device and reflecting said collected luminous flux onto the surface of a photoconductor; and
a toroidal lens disposed between the deflection device and the spherical mirror in optical alignment therewith.

8. A light beam scanning optical system as claimed in claim 7, further comprising a luminous flux rectifying means for rectifying the emitted luminous flux from the light source means into one of a parallel luminous flux and a convergent luminous flux.

9. A light beam scanning optical system comprising:
a light source means for emitting a modulated luminous flux;
a luminous flux converging means for converging said modulated luminous flux emitted from the light source means into a straight line in a direction parallel to a deflection plane;
a deflection device disposed in the vicinity where said luminous flux is converged into said straight line for deflecting the converged luminous flux at an equiangular velocity;
a spherical mirror for collecting a luminous flux from the deflection device and turning said collected luminous flux onto the surface of a photoconductor; and
a toroidal lens disposed between the deflection device and the spherical mirror in optical alignment therewith, wherein the deflection device and the spherical mirror fulfill the following two equations;

$$(|s/R_M|) > 0.4 \quad (3)$$

$$0.2 < (d/|R_M|) < 0.7 \quad (4)$$

wherein d is a distance from a point of deflection of the deflection device to the vertex of the spherical mirror, $R_M$ is a radius of curvature of the spherical mirror and s is a distance from said point of deflection to a light collecting point after reflection at said deflection device.

10. A light beam scanning optical system as claimed in claim 9, further comprising a luminous flux rectifying means for rectifying the emitted luminous flux from the light source means into one of a parallel luminous flux and a convergent luminous flux.

11. A light beam scanning optical system as claimed in claim 9, wherein the toroidal lens is offset to one side of the direction of deflection of the luminous flux.

12. A light beam scanning optical system as claimed in claim 11, wherein the spherical mirror is offset to one side of the direction of deflection of the luminous flux.

* * * * *